UNITED STATES PATENT OFFICE.

HENRY T. NEIDLINGER, OF OSWEGO, NEW YORK.

PROCESS OF MAKING MALT SYRUP.

1,227,184. Specification of Letters Patent. Patented May 22, 1917.

No Drawing. Application filed September 6, 1912. Serial No. 718,834.

*To all whom it may concern:*

Be it known that I, HENRY T. NEIDLINGER, a citizen of the United States, residing in the city of Oswego, county of Oswego, and State of New York, have invented new and useful Improvements in Processes of Making Malt Syrup, of which the following is a specification.

This invention is a process of making malt syrup, and the object of the invention is the production of an edible product of highly nutritive and dietetic value which can be eaten alone, or, used as an ingredient, in confections such as, *e. g.*, in ice cream, caramels, bonbons, etc.

As is well known, cane sugar is comparatively difficult to digest, and, moreover, is quite expensive. For these reasons, glucose is quite generally mixed with cane sugar in making confectionery. The sweetening power of glucose, however, is very considerably less than that of cane sugar, and, accordingly, it can be used to only a limited extent.

The present invention permits the substitution or replacement of cane sugar in manufacturing confections entirely by malt syrup, the main constituent of which is maltose, and yet produce very considerably superior products from palatable, dietetic and nutritive standpoints.

It has been proposed heretofore to employ certain comparatively crude forms of malt extracts in medicinal preparations, and to use them to a limited extent, also, in foods, but the malt syrup has never been made in such manner, nor has it been of such character, as to permit of its extensive use in confections. Accordingly, cane sugar and glucose have continued to be the main sweetening constituents of confections.

In the preferred way of preparing my improved malt syrup, I make a mixture consisting of one part of barley malt and two parts of wheat malt, by weight, in a ground state or condition, and thoroughly moisten or saturate the mixture with water, at a temperature of substantially 149° F., and I maintain the mash at this temperature for about fifteen minutes. By this operation the starch of the grains is converted into maltose and dextrin. Additional water, at about boiling temperature, is then added to the mash if desired, and the digestion continued under slow and gradually increasing temperature, until the temperature reaches about 171° F., at which point all or substantially all of the starch in the mixture is converted into maltose.

The conversion into maltose having been completed as described, the wort extract is drawn off in a clear state, and introduced into an evaporating pan, the wort at this stage containing about 20% of sugar, as indicated by a Balling saccharometer. The wort or extract is then concentrated or evaporated very slowly, at or near its boiling point, the evaporation continuing, as a rule, from 4 to 5 hours, or until the syrup attains a density of substantially 36° Baumé. During this slow evaporation, the precipitation of the bulk of the albuminoids takes place, and they may be separated from the supernatant syrup in any well known way, such as decantation or filtration. In order to eliminate the residuary albuminous constituents, the syrup or extract is quickly cooled down to the freezing point, *i. e.*, to substantially 32° F., which procedure results in practically the complete elimination or separation, by precipitation of all the remaining albuminous or glutinous ingredients. The syrup is then filtered through a filter press or in any other well known manner. The resulting clear syrup is of a very permanent character, and will not become turbid or cloudy when subjected to either heat or cold. In this respect, it is distinctly different from malt syrups heretofore produced.

The syrups thus prepared may now be used as an ingredient in confections to replace, either in whole or in part, the cane sugar or glucose heretofore employed, and may also be used as a table syrup, either alone or mixed with maple syrup, as well as in soda fountains, etc. When used in confections, no "sugaring" (crystallizing) occurs, as is the case with confectionery as usually made, and this is one of the very valuable properties of the new malt syrup.

The employment of the wheat malt results in a larger yield of syrup than if barley alone were used, this being due to the fact that wheat contains a considerably larger percentage of starch. Moreover, the employment of wheat malt results in the production of a very light syrup, *i. e.*, one almost white. This permits its use in the manufacture of substantially uncolored confections, such for example, as vanilla caramels, etc. Then again, the resulting syrup is substantially free from the flavor and odor of malt.

The malt syrup can be employed in confections, to an extent of 60% or over of the weight of the confection, the other ingredients of the confection being the usual ones like milk, cream, flavor, etc. It will be thus observed that the resulting confection is necessarily a very valuable food product because of its exceptional palatability, nutritiousness and digestibility.

It will, of course be understood that the procedure outlined may be modified as to details without departing from the spirit of the invention, and it is not desired to have the hereinafter claims restricted except in so far as may be necessary by the prior state of the art.

Having thus fully described the invention, what I claim as new, and desire to secure by Letters Patent is:—

1. The process of preparing malt syrup which consists in making a wort or extract from malted grain by digesting said grain with water at a temperature of substantially 149° F., subsequently slowly and gradually increasing the temperature until it reaches substantially 171° F., separating the extract from the residual solid matter and evaporating it to a consistency of substantially 36° Baumé, and then separating it from the albuminous and other constituents which may have precipitated.

2. The process of preparing malt syrup which consists in making a wort or extract from malted grain by digesting said grain with water at a temperature of substantially 149° F., subsequently slowly and gradually increasing the temperature until it reaches substantially 171° F., separating the extract from the residual solid matter and evaporating it to a consistency of substantially 36° Baumé, separating it from the albuminous and other constituents which may have precipitated, then quickly cooling said extract to a comparatively low temperature whereby the residual albuminous and glutinous ingredients are precipitated, and then separating the resulting extract or syrup from said precipitated material.

In testimony whereof I have signed my name to this specification in the presence of two subscribing witnesses.

HENRY T. NEIDLINGER.

Witnesses:
    JAS. H. GRIFFIN,
    F. S. FITZSIMONS.